S. J. BAIRD.

Automatic Button-Hole Attachment for Sewing Machines

No. 4,794.

Reissued March 12, 1872.

Witnesses

Edmund Masson.

Inventor.

Samuel J. Baird

AM. PHOTO-LITHOGRAPHIC CO. N.Y. (OSBORNE'S PROCESS.)

UNITED STATES PATENT OFFICE.

SAMUEL J. BAIRD, OF WAYNESBOROUGH, VIRGINIA.

IMPROVEMENT IN BUTTON-HOLE ATTACHMENTS FOR SEWING-MACHINES.

Specification forming part of Letters Patent No. 97,856, dated December 14, 1869; reissue No. 4,794, dated March 12, 1872.

DIVISION A.

SPECIFICATION.

I, SAMUEL J. BAIRD, of Waynesborough, county of Augusta, State of Virginia, have invented an Improvement in Button-Holing Attachments for Sewing-Machines, of which the following is a specification:

*Nature and Object of the Invention.*

The object of my invention is to feed a fabric to the needle of the sewing-machine in such a way as to insure a series of stitches being laid by the needle around the edge of a button-hole in the fabric; and my invention consists of a device which may be attached to the work-plate of an ordinary sewing-machine so as to be operated by the needle-arm, and which will carry the fabric in such a manner as to insure the desired distribution of the stitches.

Figure 1:
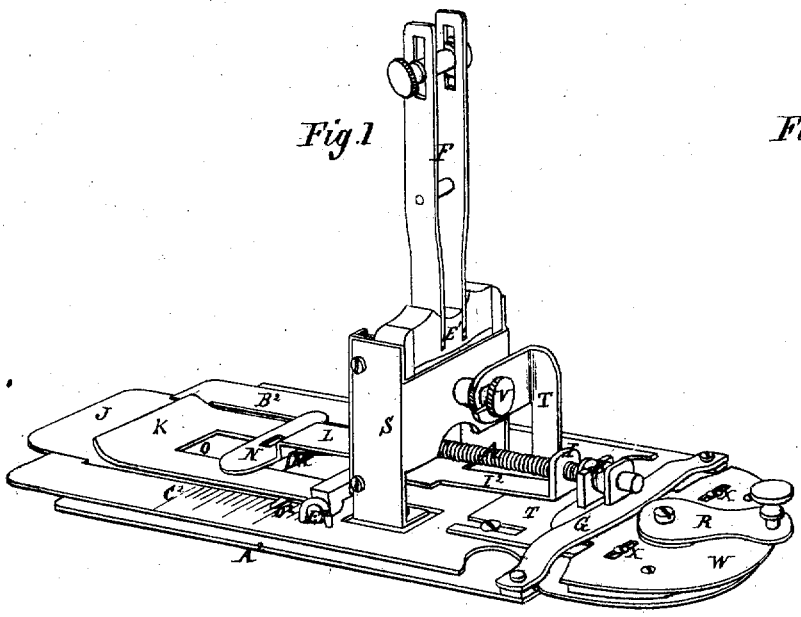
Figure 2:
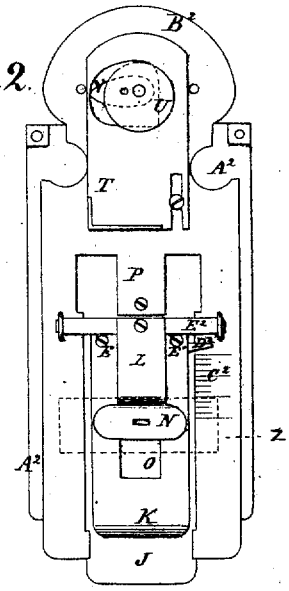
Figure 3:
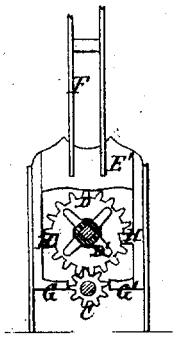
Figure 4:
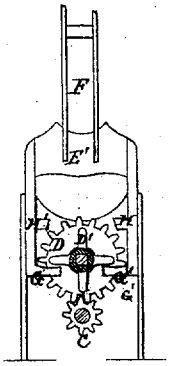
Figure 5:
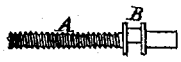
Figure 6:
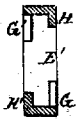
Figure 7:
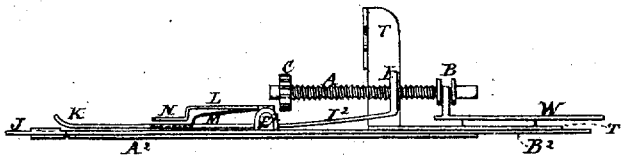
Figure 8:
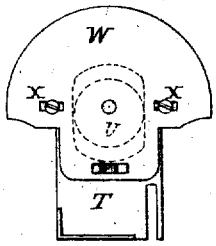

In the drawing, Figure 1 is a perspective view of my improved button-holing attachment for sewing-machines; Fig. 2, a plan view of part of the device; Figs. 3 and 4, sectional views of parts of the device; Fig. 6, a detached sectional view; Fig. 7, a side view of the device, some of the parts being removed; and Fig. 8, a detached plan view.

The attachment consists mainly of the base-plate $A^2$, a plate, $B^2$, oscillating on a pin, P, projecting from the base-plate, a clamp, and devices, fully described hereafter, for imparting from the needle-arm of the sewing-machine the requisite movements to the oscillating plate and clamp. The plate $A^2$ is fastened to the work-plate of the machine, and is dotted at Z, Fig. 2, so as not to interfere with the movements of the usual feed, which, however, performs no duty when the button-holing attachment is in operation. The clamp consists of two plates, J K, which slide in and are guided by a slot in the oscillating plate $B^2$, which is also slotted for the passage of vertical standards secured to the base-plate, and support a casing, S. The upper plate K of the clamp is connected loosely, by screws E E at its rear end, to the lower plate, and in the latter is a slot beveled at the edges, the plate K being also slotted, and the edges of the slot being bent down so that the fabric confined between the two plates is pressed down through the lower slot close upon the plate $A^2$. These depressed edges of the upper plate may be notched or serrated, if necessary, to give a firmer hold upon the fabric, and the front edge of the plate is turned up to facilitate the introduction of the fabric between the jaws. To a shaft, $E^2$, resting in staples or bearings on the oscillating plate $B^2$, is secured an arm, L, having at the outer end a plate or "rest," N, for receiving the presser-foot of the sewing-machine, which forces downward the said rest and presses the plate K firmly on the fabric. The plate N is slotted, and the base-plate $A^2$ beneath it is pierced with a small hole for the passage of the needle, and the said plate N oscillates with the plate $B^2$, and may be turned upward, on the journals of the shaft $E^2$ as an axis, to release the fabric. A spring, M, beneath the plate, extends into the slot in the plate K, and, bearing on the cloth, holds it down with a gentle pressure, the spring being slotted for the passage of the needle. The oscillating movements of the plate $B^2$ and the longitudinal movements of the clamp are derived from a horizontal screw-shaft, A, which turns at one end in a bearing attached to the case S, and at the opposite edge in a bearing on a bridge, G, secured to the base-plate $A^2$. Lugs on a plate, W, secured to but adjustable on the plate $B^2$, extend upward at opposite sides of a cam, B, on the said shaft A, and, as the latter revolves with an intermittent motion, are alternately struck by the cam, which thus imparts an oscillating motion to the plate $B^2$ on its pin P, there being an interval of rest during the time when the needle is penetrating and being withdrawn from the cloth. To the clamp is jointed a rod, $I^2$, which is connected at its opposite end to a nut, I, on the screw A, the rotation of which—first in one direction and then in another—imparts a traversing motion to the nut, and through it a reciprocating longitudinal feed to the clamp. The oscillating movement of the plate $B^2$, imparted to the clamp and to the fabric, first brings the latter to a position to be penetrated by the needle near the edge of the button-hole, and then carries it laterally, so that the next downward movement of the needle is through the button-hole opposite the edge of the fabric, these movements being imparted alternately, while the fabric is also being carried longitudinally, by the traversing motion of the nut, until the entire edge has been bound. In order, after binding one edge, to bring the opposite edge under the action of the needle, a cam, U, on the plate $B^2$, is turned so as to bear against the plate W, whereby, without alternating the position of the lugs in relation to the cam B, the plate $B^2$ is adjusted on its pin P so as to move the front end of the plate laterally and thus carry the unbound edge of the fabric to a position beneath the needle, after which adjustment the oscillating motion, but on the new line, will be imparted by the cam B, as before, the clamps carrying the fabric longitudinally in a direction the reverse of that first imparted, owing to the rotation of the screw A being reversed, as described hereafter. The ends of the holes are to be bound by stitches continued past the ends of the slits on each side. This is accomplished by carrying the cam U around, say, one-fourth of its whole movement, and holding it in that position until the one side of the end is formed, then carrying it around to corresponding position on the other side until the formation of the end is complete. The length of the stitch may be regulated, if desirable, by making the pin P, in which the plate $B^2$ oscillates, adjustable by means of an adjustable eccentric, or of eccentrics of graduated eccentricity on the screw A, or by adjusting the lugs against which the eccentric bears, or otherwise. Projecting from the side of the clamp $D^2$, Figs. 1 and 2, is an index-finger, by means of which and a graduated scale, $C^2$, on the oscillating plate, the length of the button-hole is regulated.

The intermittent rotary movement of the screw-shaft A in either direction is imparted from the needle-arm as follows: On the inner end of the shaft A is a pinion, C, gearing with a cog-wheel, D, which has twice as many teeth as the pinion, and is secured to an adjustable shaft, Y, turning in and projecting through the sides of the case S. At one side of the wheel D is a ratchet-wheel having four teeth, as shown in Figs. 3 and 4, and within the case slides vertically a rack consisting of a slide or frame on which are four teeth, G H G′ H′; the first two being on one vertical plane and the latter two on another, Fig. 6, one pair only of these teeth (those on the same plane) operating at the same time. The rack is operated by the needle-bar of the machine, which passes through a collar of a connecting-arm, F, and carries the rack with it, as it ascends and descends in driving the needle. The connecting-arm is so constructed that the vibrating needle-arm moves freely between its links, and only operates it so far as is necessary to drive the ratchet. The parts being so adjusted that the teeth G and H of the rack are in the same plane with the ratchet $D^1$, the tooth H, as the rack descends, will drive down the interposing tooth of the ratchet-wheel until the latter assumes the position shown in Fig. 3, its teeth being at an angle of forty-five degrees. The rack-tooth is made of such length that it can only carry the wheel thus far; and to aid in fixing it in this position, the head of the rack is arranged at such a distance that when the rack descends the portion $E^1$ rests upon the two upper teeth of the ratchet-wheel, thus holding the latter in the position indicated. When the rack again rises the tooth H is carried up past the upper tooth of the ratchet-wheel, and immediately the tooth G on the opposite side of the rack comes in contact with the lower adjacent tooth of the ratchet-wheel and carries it up to the position shown in Fig. 4, at right angles to the perpendicular. Each successive descent and return of the needle and the rack with it brings in succession a new tooth into the same position, thus accomplishing a quarter revolution of the ratchet and wheel, and, consequently, a semi-revolution of the pinion, screw-shaft, and eccentric at every descent of the needle. When by this means one side of the button-hole has been formed, the shaft of the ratchet-wheel is shifted, by means described hereafter, so as to be actuated by the other pair of rack-teeth, the operation of which instantly reverses the revolution of the wheel, and with it that of the screw, and thus changes the direction of the movements of the clamps. In order that the change in the direction of the rotation of the shaft A may be simultaneous with the adjustment of the oscillating plate, when the opposite side of a button-hole is to be bound a sliding plate, T, (an arm on which is forked to embrace the shaft Y of the ratchet-wheel,) is secured to the plate $C^2$ and is under the control of cam V, so that on the rotation of the cam-shaft the shaft Y will be drawn in or out simultaneously with the adjustment of the plate $C^2$ through the medium of the cam U. To facilitate the turning of the cams an arm, R, is secured to the cam-shaft. In order to bring the one or the other pair of teeth of the rack into connection with those of the ratchet-wheel, the cam T, instead of operating upon the hub of the ratchet, may embrace the rack itself, which will be adjusted laterally on the movement of the carrier. The rack itself, instead of being made in the form represented in the drawing, may be made of two plates of metal, the planes of which shall be at right angles to the axis of revolution of the ratchet, with slots vertically in the middle to allow their descent on each side of the axle, pins being inserted at such points as to correspond with and subserve the purpose of the teeth G H G′ H′. The ratchet would then lie between the two plates, and its teeth be operated by the pins projecting from the surface of the one or other plate, as already described. Instead of the cam V the plate T may be separated by a pin on the cam U.

*Claims.*

1. An attachment for sewing-machines, carrying a clamp for holding a fabric, and the devices described, or their equivalents, whereby the movements of the clamp are imparted from the overhanging needle-arm of the machine.

2. In an attachment for sewing machines, the combination of a clamp, J K, a screw-shaft carrying a cam and a nut, and to which an intermittent rotary motion in either direction is imparted, and the devices described, or their equivalents, whereby the clamp is carried longitudinally and oscillated by the action of the said shaft, its cam and nut.

3. The combination of the said shaft A and the adjusting devices described, or their equivalents, whereby the shaft may be driven in either direction from the needle-arm of the machine.

4. The combination of the reciprocating clamp and a plate, N, arranged to receive the presser-foot of the machine and to bear upon the clamp, substantially as described.

5. The combination of the said plate N and the shaft $E^2$, to which the plate is connected so as to be adjustable, as set forth.

6. The combination of the adjusting devices, or their equivalents, for simultaneously changing the motion of the shaft A and the lateral position of the clamp.

7. The lugs adjustable on the plate $C^2$, substantially as and for the purpose described.

In testimony whereof I have signed my name to this specification in the presence of two subscribing witnesses.

SAMUEL J. BAIRD.

Witnesses
R. W. BAIRD,
E. E. BAIRD.